G. WALTHER.
CAST METAL WHEEL.
APPLICATION FILED JAN. 24, 1917.
1,283,995.
Patented Nov. 5, 1918.
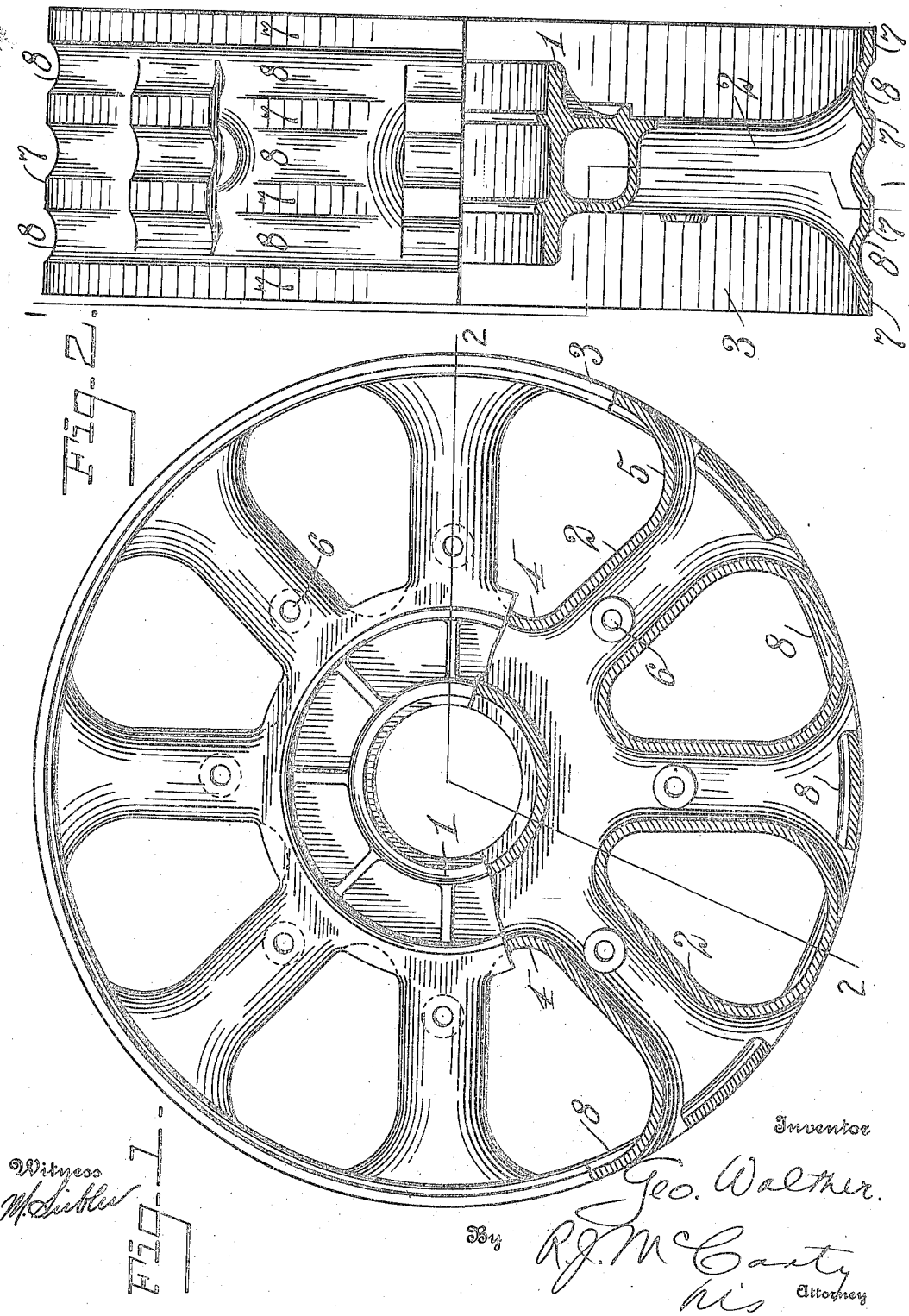

UNITED STATES PATENT OFFICE.

GEORGE WALTHER, OF DAYTON, OHIO.

CAST METAL WHEEL.

1,283,995.

Specification of Letters Patent.  Patented Nov. 5, 1918.

Application filed January 24, 1917. Serial No. 144,101.

*To all whom it may concern:*

Be it known that I, GEORGE WALTHER, citizen of the United States, residing at Dayton, in the county of Montgomery and State of Ohio, have invented certain new and useful Improvements in Cast Metal Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in vehicle wheels such as are specially designed for motor trucks. The object of the present invention is to provide a wheel of increased strength and durability at the rim without materially increasing the weight thereof. In such a construction the spokes may be solid, or in other words, the wheel may be built up or the spokes may be hollow and integrally united to the rim.

With the foregoing object in view, the invention will be more particularly described in connection with the accompanying drawings, of which Figure 1 is a side elevation of my improved cast steel wheel, with parts thereof broken away on the line 1—1 of Fig. 2 to facilitate the illustration. Fig. 2 is a sectional view on the line 2—2 of Fig. 1.

Referring in more particular terms, 1 designates the hub, 2 the spokes, and 3 the rim, all of which are integrally united by being made in a single steel casting. The spokes 2 are hollow as is also the hub in order that a desirable degree of lightness of the structure shall be obtained and at the same time strength shall likewise be obtained in the structure. As before stated the spokes may be solid if by so making them the weight of the wheel is not perceptibly increased. The said spokes where they leave the hub 1 extend in broadly sweeping curves 4, and also the outer ends of said spokes extend to the rim 3 in broadly sweeping curves 5. The said spokes are provided with openings 6 through which the cores used in making the casting may be removed from the spokes in a convenient manner. Referring now to the feature which involves the present invention, the rim of the wheel, whether it be integrally united to the spokes or whether the spokes are hollow, is corrugated annularly throughout the circumference thereof to increase the strength of said rim. These corrugations are formed by a number of annular depressions 8 which provide a number of peripheral corrugations 7 throughout the circumference of the wheel. In the drawings three such annular depressions are shown and four annular corrugated surfaces, but it will be understood that these may vary according to the width of the rim or in accordance with the size of the depressions. It is to be understood that around the rim so corrugated an elastic tire is placed. This, however, is no part of the present invention and its illustration has therefore been omitted.

Having described my invention, I claim:

A metal wheel, the hub, spokes and rim of which consist of one integral casting and the hub and spokes thereof being hollow, the rim being of a single thickness of metal and provided with annular corrugations throughout its circumference, substantially as described.

In testimony whereof I affix my signature.

GEORGE WALTHER.